UNITED STATES PATENT OFFICE.

THEODOR MUCHALL, OF BIEBRICH, GERMANY, ASSIGNOR TO THE FIRM OF KALLE AND COMPANY, OF BIEBRICH, GERMANY.

RED-VIOLET SULFUR DYE AND PROCESS OF MAKING SAME.

No. 796,443.      Specification of Letters Patent.      Patented Aug. 8, 1905.

Application filed September 7, 1904. Serial No. 223,613.

*To all whom it may concern:*

Be it known that I, THEODOR MUCHALL, a subject to the King of Prussia, Emperor of Germany, residing at Biebrich, Germany, have invented certain new and useful Improvements in the Manufacture of Red-Violet Sulfur Dyes, of which the following is a specification.

My invention relates to a new sulfur color dyeing a red violet on cotton. I have discovered that a poly-oxyrosindulin is formed if an aqueous suspension of benzene-azo-alpha-naphthylamin is boiled with para-amidophenol at a reflux cooler. This rosindulin derivative has only very little affinity to the cotton fiber; but it yields when melted with an alkali polysulfid a sulfur color which dyes on cotton a red-violet shade of considerable fastness.

In order to show the manner in which my invention may be carried out, I give the following example; but my invention is not limited to the particulars of this example:

Thirty kilos benzene-azo-alpha-naphthylamin, thirty-five kilos para-amidophenol, twenty-four kilos concentrated hydrochloric acid, and one hundred and fifty liters of water are boiled in an enameled pan fitted with a reflux cooler until a test is completely soluble in dilute caustic-soda lye—that is to say, until all the benzene-azo-alpha-naphthylamin employed has entered into the reaction. This requires about five to six hours' boiling. The reaction mass is now made alkaline with caustic-soda lye and freed from anilin formed during the reaction by a current of steam. The new rosindulin derivative is then precipitated from its alkaline solution by addition of hydrochloric acid.

Fifteen kilos of the polyoxy-rosindulin, obtained in the above-described manner, are dissolved with six kilos caustic-soda lye of 40° Baumé in fifty liters of water. A solution of forty kilos crystallized sodium sulfid and fifteen kilos of sulfur in little water is now added. The mixture is then heated gradually in an oil-bath up to 160° centigrade and kept five hours at this temperature. The melt is then dissolved in water, and the new sulfur dye is precipitated from the so-obtained solution by hydrochloric acid. It is filtered, washed, and dried.

The new product is insoluble in water. In an aqueous solution of sodium sulfid it is soluble with a bluish-red color, which is not altered by addition of an alkali. In alcohol and in dilute caustic-alkali lyes it is little soluble. In concentrated sulfuric acid it is soluble with blue color. It dyes a red violet on unmordanted cotton in a bath containing sodium sulfid.

What I claim is—

1. As a new process for the manufacture of a sulfur dye by boiling benzene-azo-alpha-naphthylamin in aqueous suspension with para-amidophenol, and melting the polyoxy-rosindulin obtained with an alkali polysulfid.

2. As a new product the reddish-violet sulfur dye, obtained by boiling benzene-azo-alpha-naphthylamin in aqueous supension with para-amidophenol, and melting the polyoxy-rosindulin obtained thereby with an alkali polysulfid, which is soluble in an aqueous solution of sodium sulfid with bluish-red color, in concentrated sulfuric acid with blue color, and which dyes a red violet on cotton from a bath containing sodium sulfid.

In testimony whereof I have signed my name to this specification in the presence of two subscribing witnesses.

THEODOR MUCHALL.

Witnesses:
    IGNAT. ROSENBERG,
    JEAN GRUND.